US009447206B2

(12) United States Patent
Dams et al.

(10) Patent No.: US 9,447,206 B2
(45) Date of Patent: Sep. 20, 2016

(54) PROCESS FOR THE PREPARATION OF ETHYLENE POLYMERS USING A NUMBER OF REACTORS ARRANGED IN SERIES

(75) Inventors: Mieke Dams, Geel (BE); Daniel Siraux, Naast (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 1128 days.

(21) Appl. No.: 12/295,249

(22) PCT Filed: Mar. 29, 2007

(86) PCT No.: PCT/EP2007/053028
§ 371 (c)(1),
(2), (4) Date: Feb. 23, 2009

(87) PCT Pub. No.: WO2007/113208
PCT Pub. Date: Oct. 11, 2007

(65) Prior Publication Data
US 2009/0326169 A1 Dec. 31, 2009

(30) Foreign Application Priority Data

Mar. 30, 2006 (EP) .................................... 06112030
Sep. 29, 2006 (EP) .................................... 06121494

(51) Int. Cl.
| C08F 2/00 | (2006.01) |
| C08F 4/00 | (2006.01) |
| C08F 110/02 | (2006.01) |
| C08F 10/00 | (2006.01) |
| C08F 4/659 | (2006.01) |
| C08F 4/6592 | (2006.01) |
| C08F 210/16 | (2006.01) |

(52) U.S. Cl.
CPC ........... *C08F 10/00* (2013.01); *C08F 4/65912* (2013.01); *C08F 4/65927* (2013.01); *C08F 110/02* (2013.01); *C08F 210/16* (2013.01)

(58) Field of Classification Search
CPC .... C08F 210/16; C08F 10/02; C08F 110/02; C08F 4/6567; C08F 4/12; C08F 2/00; C08F 85/00; C08F 4/00; C08F 4/29
USPC .......... 526/65, 72, 226, 64, 86, 90, 106, 352
See application file for complete search history.

(56) References Cited

U.S. PATENT DOCUMENTS

| 4,859,749 | A | | 8/1989 | Franke | |
| 5,371,145 | A | * | 12/1994 | Daniell et al. ................. | 525/240 |
| 6,225,421 | B1 | * | 5/2001 | Promel et al. .................. | 526/65 |
| 6,407,185 | B1 | | 6/2002 | Promel | |
| 6,545,088 | B1 | * | 4/2003 | Kolthammer et al. ......... | 525/53 |
| 6,878,784 | B1 | | 4/2005 | Asumalahti et al. | |
| 6,946,521 | B2 | | 9/2005 | Miserque et al. | |
| 2004/0077803 | A1 | * | 4/2004 | Marechal ............. | B01J 19/1837 526/64 |
| 2009/0246433 | A1 | * | 10/2009 | Michie et al. ................ | 428/36.9 |

FOREIGN PATENT DOCUMENTS

| BE | 1046655 A1 * | 10/2000 | ............ C08F 210/16 |
| EP | 0781300 | 7/1997 | |
| EP | 0603935 B1 | 4/2000 | |
| EP | 1041090 A1 | 10/2000 | |
| EP | 1044995 A1 | 10/2000 | |
| EP | 1630178 A | 3/2006 | |
| EP | 1847554 A1 | 10/2007 | |
| EP | 1905785 A1 | 4/2008 | |
| JP | 2004143289 | 5/2004 | |
| JP | 2004143289 A * | 5/2004 | |
| WO | 9608520 A1 | 3/1996 | |
| WO | 2007113208 A1 | 10/2007 | |

OTHER PUBLICATIONS

Foreign communication from a related application—International Preliminary Report on Patentability, PCT/EP2007/053028, Sep. 30. 2008, 5 pages.
Foreign communication from a related application—International Search Report and Written Opinion, PCT/EP2007/053028, Jul. 5, 2007, 6 pages.
Office Action issued in Japanese Patent Application No. 2009-502090, dated Jul. 5, 2012 and English translation thereof (4 pages).

* cited by examiner

*Primary Examiner* — Alexa Neckel
*Assistant Examiner* — Elizabeth Eng
(74) *Attorney, Agent, or Firm* — Albert Shung

(57) ABSTRACT

The present invention relates to a process for the preparation of ethylene polymers using a number of reactors arranged in series comprising the steps in which
a) ethylene, a diluent, a catalyst, a co-catalyst and optionally comonomers and hydrogen are introduced into a first reactor,
b) polymerization of ethylene and optionally comonomers is carried out in the reaction mixture of said first reactor to make ethylene polymers,
c) reaction mixture is discharged from said first reactor,
d) said reaction mixture and fresh ethylene and optionally comonomers and hydrogen are introduced into the consecutive reactor to make additional ethylene polymers,
e) said reaction mixture is discharged from said consecutive reactor and introduced into the further consecutive reactor, if any, with fresh ethylene and optionally comonomers and hydrogen to make additional ethylene polymers, steps c) and d) are repeated until the last reactor of the series,
f) reaction mixture is discharged from last reactor of the series and ethylene polymers are recovered,
wherein,
additional co-catalyst is injected in at least a subsequent reactor of the series.
Advantage of the process of the present invention is mainly to decrease catalyst consumption for the same polyethylene production, in other words to increase the productivity. In a most preferred embodiment the process of the present invention is carried out in two loop reactors under slurry conditions.

18 Claims, No Drawings

PROCESS FOR THE PREPARATION OF ETHYLENE POLYMERS USING A NUMBER OF REACTORS ARRANGED IN SERIES

CROSS-REFERENCE TO RELATED APPLICATIONS

This application claims the benefit of PCT/EP2007/053028, filed Mar. 29, 2007, which claims the benefit of European Patent Application 06112030.9, filed on Mar. 30, 2006 and European Patent Application 06121494.6, filed on Sep. 29, 2006.

FIELD OF THE INVENTION

The present invention is a process for the preparation of ethylene polymers using a number of reactors arranged in series. It relates, in particular, to a process wherein a catalyst and a co-catalyst are injected in a first reactor and additional co-catalyst is injected in at least a subsequent reactor. By way of example, the process according to the present invention may be applied in a double loop polymerization reactor consisting of two liquid full loop reactors, comprising a first and a second reactor connected in series by one or more settling legs of the first reactor connected for discharge of slurry from the first reactor to said second reactor. In series connected reactors are particularly suitable for the preparation of bimodal polyethylene (PE).

THE PRIOR ART AND THE TECHNICAL PROBLEM

Polyethylene (PE) is synthesized via polymerizing ethylene ($CH_2=CH_2$) monomers. Because PE is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Polyethylene polymerizations are frequently carried out using monomer, diluent and catalyst and optionally co-monomers and hydrogen in reactors arranged in series. These reactors are usually loop reactors. The polymerization is usually performed under slurry conditions, wherein the product usually consists of solid particles and is in suspension in a diluent. The slurry contents of the first reactor are circulated continuously with a pump to maintain efficient suspension of the polymer solid particles in the liquid diluent. The slurry from the first reactor is discharged to the subsequent reactor connected in series by one or more settling legs of the first reactor connected for discharge of slurry from the first reactor to said subsequent reactor. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, additives can be added and finally the polymer is extruded and pelletized.

Prior art has already described preparation of ethylene polymers using a number of reactors arranged in series.

U.S. Pat. No. 6,878,784 relates to a process to make a bimodal polyethylene in a combination of a slurry polymerization and a gas-phase polymerization.

EP 1041090 relates to a process for producing high density polyethylene in the presence of a metallocene catalyst system in two liquid full loop reactors in series, wherein in a first reactor a first polyethylene product is polymerized substantially by homopolymerization of ethylene and hydrogen, optionally with a minor degree of copolymerization of ethylene with an alpha-olefinic comonomer comprising from 3 to 8 carbon atoms, and in a second reactor serially connected to the first reactor downstream thereof a second polyethylene product is copolymerized from ethylene and an alpha-olefinic comonomer comprising from 3 to 8 carbon atoms, and a hydrogenation catalyst is introduced into the reactants downstream of the first reactor.

U.S. Pat. No. 6,946,521 relates to polyethylene resins, especially to those suitable for use as pipe resins, and to a process for producing such resins. In a preferred arrangement, the product of a first cascade reaction zone, including the olefin monomer, is contacted with the second co-reactant and the catalyst system in a second cascade reaction zone to produce and mix the second polyolefin with the first polyolefin in the second reaction zone. The first and second reaction zones are conveniently interconnected reactors such as interconnected loop reactors or interconnected loop and continuously stirred reactors. It is also possible to introduce into the second reaction zone fresh olefin monomer as well as the product of the first reaction zone. Because the second polyolefin is produced in the presence of the first polyolefin a multimodal or at least bimodal molecular weight distribution is obtained. In one embodiment of the invention, the first co-reactant is hydrogen and the second co-reactant is the comonomer. Typical comonomers include hexene, butene, octene or methylpentene, preferably hexene. In an alternative embodiment, the first co-reactant is the comonomer, preferably hexene.

It has now been discovered that in a process for the preparation of ethylene polymers under slurry conditions using a number of reactors arranged in series wherein a catalyst and a co-catalyst are injected in a first reactor and additional co-catalyst is injected in at least a subsequent reactor, the off gas of the subsequent reactor is decreased by comparison with the same process in which there is no additional co-catalyst injected in at least a subsequent reactor. "Off gas" means the reactor's purge of unpolymerized ethylene, unpolymerized co-monomer if any, hydrogen and insoluble gas. This off gas reduction means a better catalyst activity in the second reactor. Capacity of the reactor is unchanged but catalyst consumption is reduced. In other words the productivity is increased.

U.S. Pat. No. 6,407,185 relates to a process for the preparation of a composition containing ethylene polymers comprising a polymer of melt index $MI_2$ of 5 to 1000 g/10 min and a polymer of melt index $MI_5$ of 0.01 to 2 g/10 min, the ratio of these indices being from 500 to 50,000 and the weight ratio of the two polymers being equal to (30 to 70):(70 to 30), according to which part of the ethylene, a catalyst derived from a transition metal having an intrinsic molecular weight distribution defined by an intrinsic $\overline{Mw}/\overline{Mn}$ ratio less than or equal to 10 and a deactivation constant less than or equal to $0.5\ h^{-1}$, and a cocatalyst are introduced into a first reactor, polymerization of the ethylene is carried out therein, a mixture comprising one of the polymers, the catalyst and the cocatalyst is drawn off from this reactor and the mixture and another part of the ethylene are introduced into a second reactor, where ethylene is polymerized to form the other polymer. At col 3 line 60-col 4 line 8 is written: "In the process according to the invention, a plant is used comprising at least two polymerization reactors arranged in series and connected to each other. Each reactor is supplied with ethylene. The catalyst and the cocatalyst are introduced solely into the first reactor, in which ethylene is polymerized until a polymer is obtained which has the characteristics specific to the polymerization conditions of this reactor. A mixture arising from the first reactor and comprising the polymer obtained in the latter, the catalyst and the cocatalyst is introduced, preferably continuously, into the second reactor. Ethylene, which is introduced into this second reactor, is polymerized therein using the catalyst and cocatalyst arising from the first reactor and polymerization conditions (temperature, concentration of transfer agent, concentration of optional comonomer) are used in this second reactor which are different from those used in the first reactor. At col 5 lines 29-33 is written: "In the process according to the invention, it is optionally possible to supply the second reactor and/or, if appropriate, at least one of the following reactors with fresh catalyst and/or cocatalyst. However, it is preferable to introduce the catalyst and the cocatalyst exclusively into the first reactor". In the course of the opposition to the european counterpart EP 603935 B1 of said U.S. Pat. No. 6,407,185 the patentee explained the advantage to introduce the catalyst and the cocatalyst exclusively into the first reactor thanks to the catalyst low deactivation constant. It is clear that the injection of co-catalyst in the second reactor is not deemed to give an advantage.

U.S. Pat. No. 4,859,749 relates to a two-stage polymerization process using a modified supported catalyst gives ethylene polymers with very good processability and excellent finished component properties. The supported catalyst used is formed by reaction of a magnesium alcoholate with a titanium-IV compound in suspension and subsequent reaction with a halogen-containing organoaluminum compound and activation of the solid thus obtained by an aluminum trialkyl or aluminum isoprenyl (the co-catalyst). It is explained that the catalyst is introduced continuously and exclusively into the first reaction stage, the co-catalyst is also introduced continuously into the first stage, and if appropriate additionally into the second stage. This introduction in the second stage is quoted as "appropriate" which means nothing but clearly there is no suggestion to make said introduction to get a higher productivity.

BRIEF DESCRIPTION OF THE INVENTION

The present invention relates to a process for the preparation of ethylene polymers using a number of reactors arranged in series comprising the steps in which
a) ethylene, a diluent, a catalyst, a co-catalyst and optionally comonomers and hydrogen are introduced into a first reactor,
b) polymerization of ethylene and optionally comonomers is carried out in the reaction mixture of said first reactor to make ethylene polymers,
c) reaction mixture is discharged from said first reactor,
d) said reaction mixture and fresh ethylene and optionally comonomers and hydrogen are introduced into the consecutive reactor to make additional ethylene polymers,
e) said reaction mixture is discharged from said consecutive reactor and introduced into the further consecutive reactor, if any, with fresh ethylene and optionally comonomers and hydrogen to make additional ethylene polymers, steps c) and d) are repeated until the last reactor of the series,
f) reaction mixture is discharged from last reactor of the series and ethylene polymers are recovered,
wherein,
additional co-catalyst is injected in at least a subsequent reactor of the series.

Advantageously no catalyst is injected in the last reactor, preferably catalyst is injected only in the first reactor.

In a preferred embodiment there are only two reactors in the series. In another preferred embodiment at least one of the reactors in the series is a loop reactor. In another embodiment all the reactors are loop reactors. In another embodiment the polymerization in all reactors of the series is performed under slurry conditions and advantageously the ethylene polymers consist of solid particles and are in suspension in a diluent. In another embodiment the slurry contents of the reactors are circulated continuously with a pump to maintain efficient suspension of the polymer solid particles in the liquid diluent. In another embodiment the reactors are liquid full loop reactors. The process of the invention can comprise any combination of at least two of the above embodiments.

In a most preferred embodiment the process of the present invention is carried out in two loop reactors under slurry conditions.

Advantage of the process of the present invention is mainly to decrease catalyst consumption for the same polyethylene production, in other words to increase the productivity (Productivity is in g of polyethylene per g of catalyst).

The present invention also relates to the following improvement:
In a process for the preparation of ethylene polymers using a number of reactors arranged in series comprising the steps in which
a) ethylene, a diluent, a catalyst, a co-catalyst and optionally comonomers and hydrogen are introduced into a first reactor,
b) polymerization of ethylene and optionally comonomers is carried out in the reaction mixture of said first reactor to make ethylene polymers,
c) reaction mixture is discharged from said first reactor,
d) said reaction mixture and fresh ethylene and optionally comonomers and hydrogen are introduced into the consecutive reactor to make additional ethylene polymers,
e) said reaction mixture is discharged from said consecutive reactor and introduced into the further consecutive reactor, if any, with fresh ethylene and optionally comonomers and hydrogen to make additional ethylene polymers, steps c) and d) are repeated until the last reactor of the series,
f) reaction mixture is discharged from last reactor of the series and ethylene polymers are recovered,
the improvement wherein,
additional co-catalyst is injected in at least a subsequent reactor of the series, amount of catalyst injected is reduced and the production capacity of the reactors in series is unchanged.

Preferred embodiments are the same as above.

Advantageously no catalyst is injected in the last reactor, preferably catalyst is injected only in the first reactor.

DETAILED DESCRIPTION OF THE INVENTION

Olefin co-monomers which are suitable for being used in accordance with the present invention may comprise but are not limited to aliphatic $C_3$-$C_{20}$ alpha-olefins. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

According to the present invention the term "catalyst" is defined herein as a substance that causes a change in the rate of a polymerization reaction without itself being consumed in the reaction. According to a preferred embodiment said catalyst is a metallocene or chromium catalyst. According to another embodiment, said catalyst may also be a Ziegler-Natta catalyst. In another particularly preferred embodiment, said catalyst may comprise any catalyst which is provided on a Si support.

The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

The term "metallocene catalyst" is used herein to describe any transition metal complexes consisting of metal atoms bonded to one or more ligands. In a preferred embodiment, the metallocene catalyst has a general formula MX, wherein M is a transition metal compound selected from group IV and wherein X is a ligand composed of one or two groups of cyclopentadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$.

The metallocene catalysts generally are provided on a solid support. The support should be an inert solid, which is chemically unreactive with any of the components of the conventional metallocene catalyst. The support is preferably a silica compound.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

The term "Ziegler-Natta catalyst" refers to a catalyst of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chlorine. Illustrative examples of the transition metal compounds comprise but are not limited to $TiCl_3$, $TiCl_4$. In a particularly preferred embodiment of the invention said catalyst is a titanium tetrachloride ($TiCl_4$) catalyst.

Ziegler-Natta catalysts generally are provided on a support, i.e. deposited on a solid support. The support should be an inert solid, which is chemically unreactive with any of the components of the conventional Ziegler-Natta catalyst. The support is preferably a silica or magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The term "co-catalyst" as used herein is defined as a catalyst that can be used in conjunction with another catalyst in order to improve the activity and the availability of the other catalyst in a polymerisation reaction. Such co-catalysts may include organometallic compounds, or a mixture of non-coordinated Lewis acids and alkylaluminiums as it is well known in the art.

Preferably, organometallic compounds of periodic groups I to III are used as co-catalyst according to the present invention. In a particularly preferred embodiment, said co-catalyst is a catalyst suitable for being used in conjunction with a metallocene catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, tri-isobutyl aluminium, tri-hexyl aluminum, diethyl aluminum chloride, or diethyl aluminum ethoxide, A particularly preferred co-catalyst for use in the present invention is tri-isobutyl aluminium.

The polymerization reaction can be carried out at a temperature of from 50 to 120° C., preferably at temperature of from 70 to 115° C., more preferably at temperature of from 80 to 110° C., and at a pressure of from 20 to 100 bars, preferably at pressure of from 30 to 50 bars, more preferably at pressure of 37 to 45 bars.

Injection of co-catalyst in at least one of the subsequent reactor of the series is made under usual conditions in such polymerizations. The man skilled in the art knows how to inject co-catalyst in a reactor. He begins to inject co-catalyst in at least one of the subsequent reactor of the series until he notices a reduction of the off gas of said subsequent reactor. By way of example:

X is the concentration of co-catalyst injected in the first reactor, X is based on the fresh diluent injected in the first reactor, the concentration of co-catalyst to be injected in at least one of the subsequent reactors and based on the fresh diluent injected in said subsequent reactor is between 0.1 X and X and advantageously between 0.3 X to 0.6 X.

As used herein, the term "polymerization slurry" or "polymer slurry" means substantially a multi-phase composition including at least polymer solid particles and a liquid phase, the liquid phase being the continuous phase. The solids include catalyst and polymerized olefin, such as polyethylene. The liquids include an inert diluent, such as isobutane, with dissolved monomer such as ethylene and optionally one or more co-monomer, molecular weight control agents, such as hydrogen, antistatic agents, antifouling agents, scavengers, and other process additives.

Suitable inert diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

By way of example, such polymerization double loop reactor working with a Ziegler-Natta catalyst, consisting of two interconnected loop reactors, whereby the reaction conditions are different in each of said loop reactors may be used to produce high molecular weight ethylene co-polymers in a first reactor and a low molecular weight ethylene co-polymers in a second reactor. Reactants fed to the first reactor may comprise ethylene, hexene, isobutane diluent, and hydrogen. Concentration of reactants in the first reactor may then for instance comprise 1% w/v ethylene, 3% w/v hexene, and a low concentration of hydrogen. The reaction temperature may comprise around 83 to 88° C. and polyethylene co-polymers having a density comprised around 0.925 g/cm$^3$ may be obtained. Polymer slurry may be transferred to the second reactor, wherein further ethylene is fed, preferably to obtain a concentration of 4% w/v in the reactor and hydrogen is added, preferably to obtain a concentration of 2 vol % in the reactor. Preferably, no additional catalyst is added in the second reactor. Also, preferably no hexene co-monomer is added in the second reactor and co-monomer concentrations in the second reactor result from the transfer of co-monomer together with polymer slurry from the first reactor. Generally residence time of the slurry in the reactor is higher in the first reactor than in the second reactor.

EXAMPLES

In the following examples catalyst is injected only in the first reactor.

Example 1

Comparative Example, No Injection of Tibal in Second Reactor

Example 2

Injection of Tibal in Second Reactor

The catalyst is a Ziegler-Natta.
Tibal (tri isobutyl aluminum) in first reactor is injected in the catalyst feed line of the first reactor. Pre-contact between catalyst and co-catalyst is short.
Tibal in second reactor is injected directly in the second reactor. Tibal concentration added in second reactor is based on fresh isobutane injected in second reactor.
The activity and productivity are computed as follows:

Activity in Reactor 1 [g/g/h/% C$_2^-$]=productivity in Reactor 1 [g/g]/(residence time [h]*C$_2^-$OG [%]). C$_2^-$OG means concentration of ethylene in Off gas.

Residence time [h]=(reactor volume [m$^3$]*d$_{slurry}$[kg/m$^3$]*solids)/PE throughput [kg/h]

Same for reactor 2. Productivity is in g of polyethylene per g of catalyst.

| Examples | 1 | 2 |
|---|---|---|
| 1st reactor | | |
| Tibal (ppm) | 511 | 462 |
| C2- (kg/h) | 21 | 22 |
| C6- (cc/h) | 1.6 | 1.6 |
| H2 (Nl/h) | 2.2 | 2.2 |
| res. time (min) | 61.2 | 60.6 |
| C2- (wt %) in off gas | 0.58 | 0.59 |
| 2nd reactor | | |
| Tibal (ppm) | 0 | 345 |
| C2- (kg/h) | 24 | 25 |
| H2 (Nl/h) | 1050 | 900 |
| res. time (min) | 32.4 | 32.4 |
| C2- (wt %) in off gas | 3.19 | 2.94 |
| H2 (vol %) in off gas | 2.17 | 1.63 |
| Final product | | |
| MI5 (g/10') | 0.53 | 0.47 |
| HLMI (g/10') | 15.4 | 13.4 |
| density (g/cc) | 0.9478 | 0.9471 |
| Productivity & activity | | |
| Productivity (g/g) | 9080 | 9796 |
| Activity Rx1 (g/g/h/% C2) | 7641 | 8104 |
| Activity Rx2 (g/g/h/% C2) | 2623 | 3134 |

The invention claimed is:

1. A process for the preparation of ethylene polymers comprising:
   introducing ethylene, a diluent, a catalyst, a co-catalyst and optionally comonomers and hydrogen into a first loop reactor to form a first reaction mixture,
   polymerizing ethylene and optionally comonomers in the first reaction mixture to form ethylene polymers,
   discharging the first reaction mixture from the first loop reactor,
   introducing the first reaction mixture and fresh ethylene and optionally comonomers and hydrogen into one or more second reactors to form additional ethylene polymers within a second reaction mixture, wherein the polymerization in all reactors is performed under slurry conditions, and wherein the one or more second reactors are arranged in series and downstream from the first loop reactor and wherein one or more second reactors comprise loop reactors;
   discharging the second reaction mixture from the one or more second reactors; and
   recovering ethylene polymer, wherein additional co-catalyst is injected in at least one of the second reactors such that the concentration of co-catalyst injected in the at least one of the second reactors, and based on the fresh diluent injected in the at least one of the second reactors, is between 0.1 X and X, wherein X is the concentration of co-catalyst injected in the first loop reactor based on the fresh diluent injected in the first loop reactor, and the production capacity of each reactor is essentially unchanged from a process wherein additional co-catalyst is not injected in at least one of the second reactors;
   wherein catalyst is injected only into the first loop reactor, and wherein the catalyst is a metallocene catalyst or a chromium catalysts.

2. The process of claim 1, wherein the catalyst is the metallocene catalyst.

3. The process of claim 2, wherein the metallocene catalyst is a transition metal complex comprising a transition metal selected from Group IV of the Periodic Table that is bonded to one or more ligands selected from cyclopentadienyl, indenyl, fluorenyl, or derivatives thereof.

4. The process of claim 2, wherein the metallocene catalyst is supported on an inert solid silica support.

5. The process of claim 1, wherein the catalyst is a chromium catalyst that is obtained by deposition of chromium oxide on a silica or alumina support.

6. The process of 1, wherein the comonomers are introduced into the first loop reactor, and comprise aliphatic $C_3$-$C_{20}$ alpha-olefins.

7. The process of claim 6, wherein the comonomers are propylene, 1-butene, 4-methyl-1-pentene, 1-hexene, 1-octene, 1-decene, 1-dodecene, 1-tetradecene, 1-hexadecene, 1-octadecene or 1-eicosene.

8. The process of claim 6, wherein the comonomer is hexene, and wherein no hexene is added to the one or more second reactors.

9. The process of claim 1, wherein the diluent is an aliphatic hydrocarbon solvent, a cycloaliphatic hydrocarbon solvent, an aromatic hydrocarbon solvents.

10. The process of claim 9, wherein the diluent is halogenated.

11. The process of claim 1, wherein the diluent is a $C_{12}$ or lower saturated hydrocarbon, a $C_5$ to $C_9$ saturated alicyclic or aromatic hydrocarbons, or a $C_2$ to $C_6$ halogenated hydrocarbon.

12. The process of claim 1, wherein the diluent is butane, isobutane, pentane, hexane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane, or trichloroethane.

13. The process of claim 1, wherein the co-catalyst is a mixture of a non-coordinated Lewis acid and an alkylaluminum.

14. The process of claim 1, wherein the co-catalyst is an organometallic compound.

15. The process of claim 14, wherein the catalyst is the metallocene catalyst and the organometallic compound has a general formula $AlR_3$, wherein R is an alkyl having 1-16 carbon atoms and each R may be the same or different.

16. The process of claim 14, wherein the catalyst is a metallocene catalyst and the organometallic compound has a general formula $AlR_2Y$, wherein R is an alkyl having 1-16 carbon atoms and each R may be the same or different, and wherein Y is hydrogen or a halogen.

17. The process of claim 1, wherein the co-catalyst is trimethyl aluminum, triethyl aluminum, di-isobutyl aluminum hydride, tri-isobutyl aluminum, tri-hexyl aluminum, diethyl aluminum chloride, or diethyl aluminum ethoxide.

18. The process of claim 1, wherein polymerization is carried out at a temperature of from 50° C. to 120° C., and at a pressure of from 20 bars to 100 bars.

* * * * *